(12) United States Patent  (10) Patent No.: US 8,323,825 B2
Jung  (45) Date of Patent: Dec. 4, 2012

(54) CAP ASSEMBLY AND SECONDARY BATTERY USING THE SAME

(75) Inventor: Sang-Sok Jung, Suwon-si (KR)

(73) Assignee: Samsung SDI Co., Ltd., Yongin, Gyeonggi-do (KR)

( * ) Notice: Subject to any disclaimer, the term of this patent is extended or adjusted under 35 U.S.C. 154(b) by 1106 days.

(21) Appl. No.: 12/236,793

(22) Filed: Sep. 24, 2008

(65) Prior Publication Data

US 2009/0117451 A1  May 7, 2009

(30) Foreign Application Priority Data

Nov. 1, 2007 (KP) .................. 10-2007-0110923

(51) Int. Cl.
*H01M 2/00* (2006.01)
(52) U.S. Cl. ....................................... 429/163; 429/122
(58) Field of Classification Search .................... 429/163
See application file for complete search history.

(56) References Cited

U.S. PATENT DOCUMENTS

2005/0266302 A1 * 12/2005 Kim .............................. 429/62

FOREIGN PATENT DOCUMENTS

| CN | 201069793 | 6/2008 |
|---|---|---|
| JP | 7-230798 | 8/1995 |
| JP | 08-153536 | 6/1996 |
| JP | 10-233199 | 9/1998 |
| JP | 2000-223103 | 8/2000 |
| JP | 2000223103 A * | 8/2000 |
| KR | 1999-49247 | 7/1999 |
| KR | 2002-21887 | 3/2002 |
| KR | 10-2005-0095949 | 10/2005 |

OTHER PUBLICATIONS

Korean Notice of Allowance issued Oct. 5, 2009, in corresponding Korean Patent Application No. 10-2007-0110923.
Office Action issued by Korean Intellectual Property Office in Korean Patent Application No. 2007-110923 on Apr. 16, 2009.
Office Action issued by The State Intellectual Property Office of the People's Republic of China on May 12, 2010.

* cited by examiner

*Primary Examiner* — Raymond Alejandro
*Assistant Examiner* — Gary Harris
(74) *Attorney, Agent, or Firm* — Knobbe, Martens, Olson & Bear LLP

(57) ABSTRACT

A secondary battery comprising: an electrode assembly; a can to house the electrode assembly; and a cap assembly to seal the can. The cap assembly includes a vent plate. The vent plate includes a concave deforming portion, a protrusion formed in the center of the deforming portion, and a notch formed around the deforming portion.

14 Claims, 3 Drawing Sheets

CAP ASSEMBLY AND SECONDARY BATTERY USING THE SAME

CROSS-REFERENCE TO RELATED APPLICATION

This application claims the benefit of Korean Patent Application No. 2007-110923, filed Nov. 1, 2007, in the Korean Intellectual Property Office, the disclosure of which is hereby incorporated herein by reference in its entirety.

BACKGROUND OF THE INVENTION

1. Field of the Invention

Aspects of the present invention relate to a secondary battery, and more particularly, to a cap assembly that deforms under a predetermined pressure and thus improves the distribution of the pressure to enhance stability, and a secondary battery using the cap assembly.

2. Description of the Related Art

In general, secondary batteries are rechargeable, unlike dry cells that cannot be recharged. Secondary batteries are being developed that are compact and have high capacities. Low-capacity batteries, which include a pack having one battery cell, are used for small portable electronic products, such as cellular phones, plasma display panels (PDPs), notebook computers, cameras, etc.

High-capacity batteries, which include a pack having multiple connected battery cells, are widely used as power supplies for hybrid vehicles, for example. In particular, lithium secondary batteries are widely used in a variety of devices; because they have a higher operation voltage (3.6V) and a higher energy density per weight than conventional nickel-cadmium batteries, nickel-metal hydride batteries, and the like.

The lithium secondary batteries may be classified as can-type lithium secondary batteries, or pouch-type lithium secondary batteries, depending the shape of a housing, which accommodates an electrode assembly. The can-type lithium secondary batteries may be further classified as prismatic lithium secondary batteries or cylinder-type lithium secondary batteries. Also, lithium secondary batteries may be classified as lithium-ion secondary batteries, or lithium-polymer secondary batteries, depending on the type of electrolyte included therein.

When a lithium secondary battery is overcharged, the resistance of an upper portion of an electrode assembly increases, due to the electrolyte evaporating from the upper portion. Further, as lithium begins to be extracted, the electrode assembly is deformed at a central portion thereof. The resistance of the upper portion of the electrode assembly causes localized heating and an increase in the internal temperature of the battery. In this case, the internal pressure of the battery rapidly increases, due to electrolyte additives, such as cyclohexane benzene (CHB), and benzopyrene (BP), which typically dissolve and generate gas when the battery is overcharged.

To solve the aforementioned problems, in a cylinder-type lithium secondary battery, when internal pressure of the battery increases above a prescribed value, due to overcharging or abnormal operation, a cap assembly interrupts current flow in the battery, so that the temperature no longer increases. This results in improved stability of the battery.

The cylinder-type secondary battery comprises a can, and a cap assembly coupled to an upper opening of the can, via an insulating gasket. The can accommodates an electrode assembly and an electrolyte. The electrode assembly consists of two rectangular plate-shaped electrodes and a separator interposed between the electrodes, to prevent a short-circuit between the two electrodes. The electrodes and the separator are wound in a jelly-roll type shape.

The cap assembly comprises a vent, a current interrupt device (CID), a positive temperature coefficient (PTC) thermistor, and a cap-up, which are sequentially stacked. In the conventional cap assembly, when internal pressure of the secondary battery is above a predetermined level, the vent is deformed to activate the CID to interrupt the flow of current, and exhausts gas generated by the electrode assembly to the exterior.

The conventional cap assembly may have a large range of activation pressures, when the vent is deformed by internal pressure. Therefore, when the vent is not deformed, but the CID should be activated to interrupt current, or when the vent is not deformed such that the CID is capable of be activated, it is difficult to secure the stability of the battery. On the contrary, when the vent is deformed to activate the CID, the battery may be discarded, even though it is still useful.

SUMMARY OF THE INVENTION

Aspects of the present invention provide a cap assembly comprising a vent. The vent includes a plate and an electric connection portion formed at one side of the plate. The electric connection portion includes a deforming portion having a convex shape and a protrusion formed on the deforming portion.

Aspects of the present invention provide a secondary battery comprising: an electrode assembly including a positive electrode plate, a negative electrode plate, and a separator interposed between the two electrode plates; a can to house the electrode assembly; and a cap assembly to seal the can. The vent includes a plate and an electric connection portion formed at one side of the plate. The electric connection portion includes a deforming portion having a convex shape and a protrusion formed at one side of the deforming portion.

According to aspects of the present invention, the protrusion and the deforming portion may extend in opposite directions.

According to aspects of the present invention, the electric connection portion may be formed in the center of the plate.

According to aspects of the present invention, the protrusion may be formed in the center of the deforming portion.

According to aspects of the present invention, a protrusion for activating a CID is disposed at a central portion of the vent, and pressure is uniformly applied to the entire area of the vent, so that the vent is uniformly deformed, thereby improving the distribution of activation pressures and enhancing stability.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
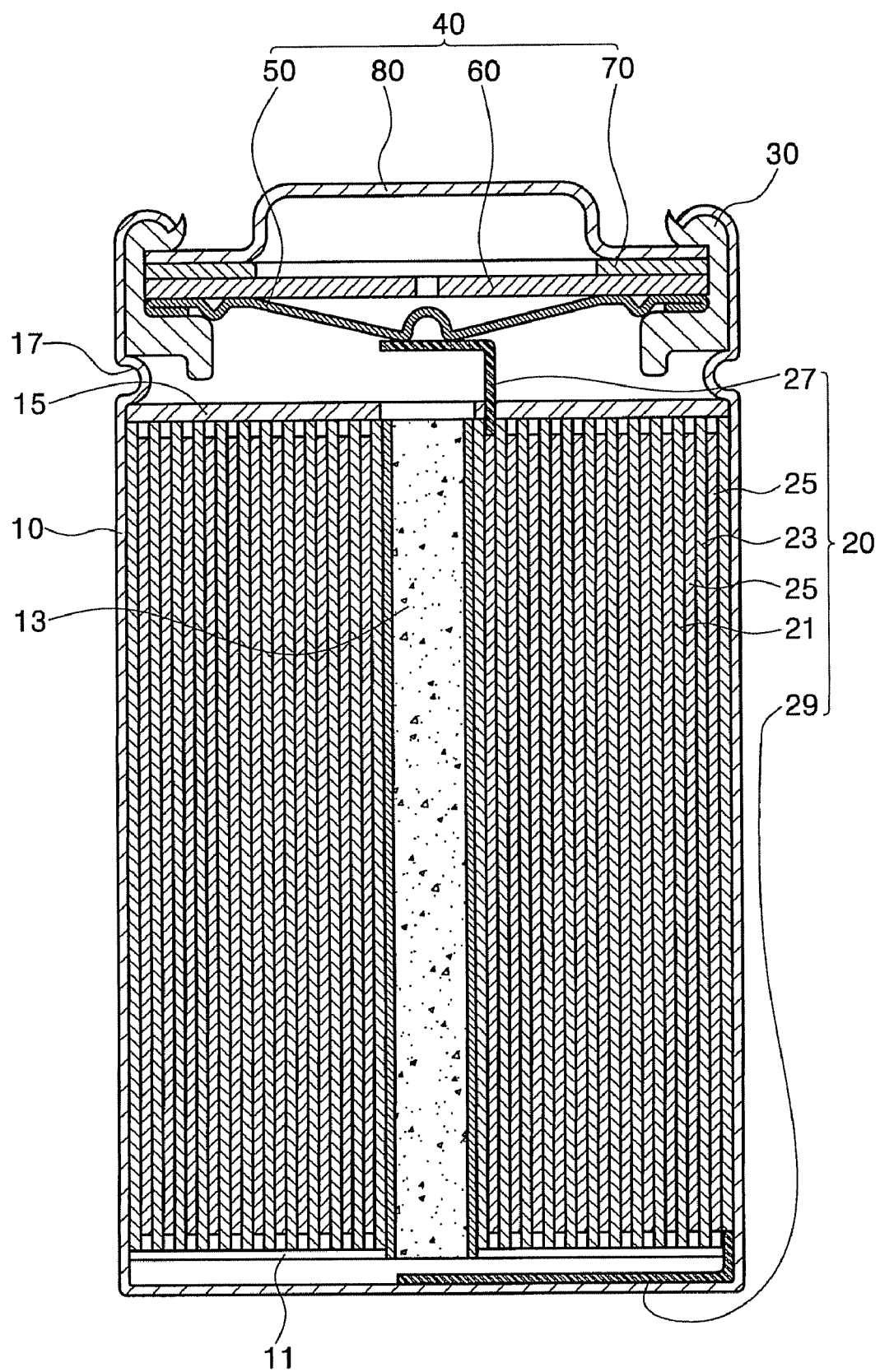
FIG. 1 is a cross-sectional view of a cylinder-type secondary battery, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures. As referred to herein, when a first element is said to be disposed "on", or adjacent to, a second element, the first element can directly contact the second element, or can be separated from the second element by one or more other elements can be located therebetween. In contrast, when an element is referred to as being disposed "directly on" another element, there are no intervening elements present. As used herein, the term "and/or" includes any and all combinations of one or more of the associated listed items.

Figure 2:
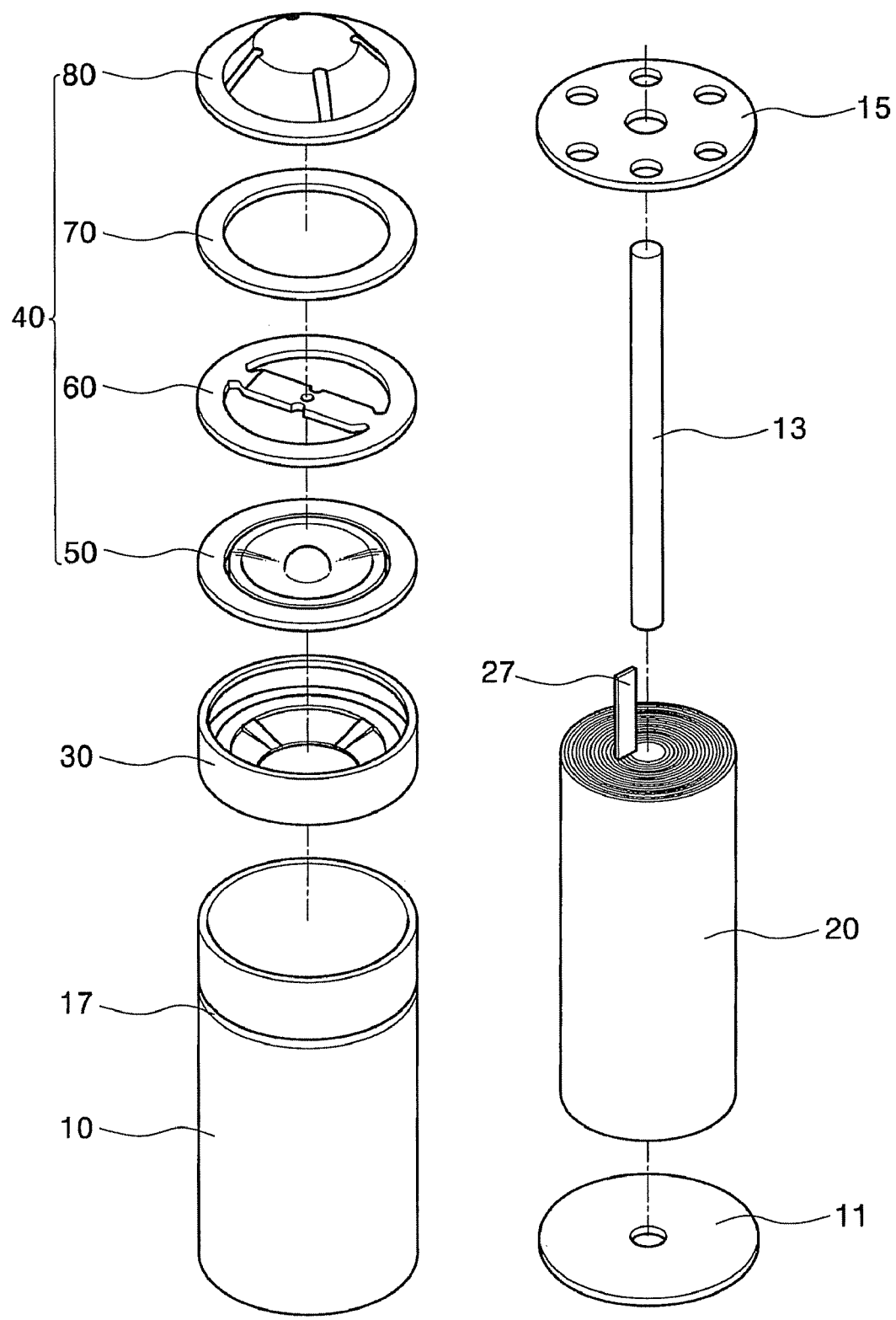
FIG. 2 is an exploded perspective view of the cylinder-type secondary battery of FIG. 1.

FIGS. 1 and 2 are a cross-sectional view and an exploded perspective view illustrating a cylinder-type secondary battery, according to an exemplary embodiment of the present invention. Referring to FIGS. 1 and 2, two plate shaped electrodes 21 and 23 are stacked and wound, resulting in a jelly-roll type electrode assembly 20. Separators 25 are interposed between the electrodes 21 and 23, and/or on or beneath the electrodes 21 and 23, to prevent short circuits between the electrodes 21 and 23.

Each of the electrodes 21 and 23 is formed by coating a collector plate with positive electrode active material slurry, or negative electrode active material slurry. The collector plates are a metal foil, or a metal mesh, made of aluminum or copper. The slurry is typically obtained by stirring a particulate active material, a subsidiary conductor, a binder, and a plasticizer in a solvent. The solvent is removed in a subsequent electrode formation process.

Non-coating portions are formed where the collectors are not coated with the slurry. Electrode tabs 27 and 29 are connected to the non-coating portions. The electrode tab 27 extends toward an opening of the can 10, and the electrode tab 29 extends toward a bottom surface of the can 10.

The can 10 is made of an iron material (stainless steel), an aluminum alloy, or the like. The can 10 can be formed by a deep drawing method. The electrode assembly 20 is inserted into the can 10, through the opening.

The bottom surface of the electrode assembly is covered with a lower insulating plate 11, prior to the insertion of the electrode assembly 20. The electrode tab 29 is bent to be parallel with the bottom surface of the can 10, while being spaced apart from a lower surface of the lower insulating plate 11. The electrode assembly 20 has a central hollow.

The lower insulating plate 11 has a hole in an area corresponding to the hollow of the electrode assembly 20. A portion of the electrode tab 29 faces the hole. A welding rod is inserted into the hollow of the electrode assembly 20, to weld the electrode tab 29 to the bottom surface of the can 10. Accordingly, the can 10 has the same polarity as the electrode tab 29, so that the can itself serves as an electrode terminal.

In some exemplary embodiments, a central pin 13 may be inserted into the hollow of the electrode assembly 20. The central pin 13 prevents the can 10 from being deformed by external forces. The central pin 13 also serves as a passage for the removal of gas generated by the electrode assembly 20.

The central pin 13 suppresses deformations of the electrode assembly 20, caused by the charging and/or discharging thereof, and which can occur over time, thereby increasing battery life.

After the electrode tab 29 is welded, an upper insulating plate 15 is positioned on the electrode assembly 20, and the electrode tab 27 is inserted through a hole of the upper insulating plate 15. The electrode tab 29 can then be welded to a cap assembly 20. The electrode tab 27 can then be welded to the bottom surface of the can 40.

A sidewall of the can 10 is then crimped to form a bead 17, to secure the electrode assembly 20 and the upper insulating plate 15. The bead 17 prevents the electrode assembly 20 from easily moving up and down inside the can 10, even during an external impact, thereby providing a reliable electrical connection.

An electrolyte is then injected into the can 10, so as to cover the electrode assembly 20. The electrolyte may be injected prior to the formation of the bead 17. An insulating gasket 30 is provided in the opening of the can 10, and the cap assembly 40 is coupled with the can 10, to seal the can 10. The insulating gasket 30 is an elastic material that is bent around the cap assembly 40. The insulating gasket 30 insulates the cap assembly 40 from the can 10, which have different polarities, and helps seal the can 10.

The cap assembly 40 includes a vent 50 electrically connected to the electrode tab 27, a current interrupt device (CID) 60 that is activated by operation of the vent 50, a positive temperature coefficient (PTC) thermistor 70, and a cap-up 80 (electrode terminal). The components of the cap assembly 40 may be preassembled and then disposed on the insulating gasket 30, or the components may be sequentially stacked on the gasket 30. The opening of the cylinder-type can 10 is then crimped against the gasket 30, to secure the cap assembly 40 and seal the can 10.

The cap-up 80 is positioned on the PTC thermistor 70, the CID 60 is positioned beneath the PTC thermistor 70, and the vent 50 is positioned beneath the CID 60. That is, the vent 50, the CID 60, the PTC thermistor 70, and the cap-up 80 are sequentially stacked. When internal pressure is above a predetermined level, due to gas generated by the electrode assembly 20, the vent 50 activates the CID 60, so as to interrupt current flow and release the gas.

Figure 3A:
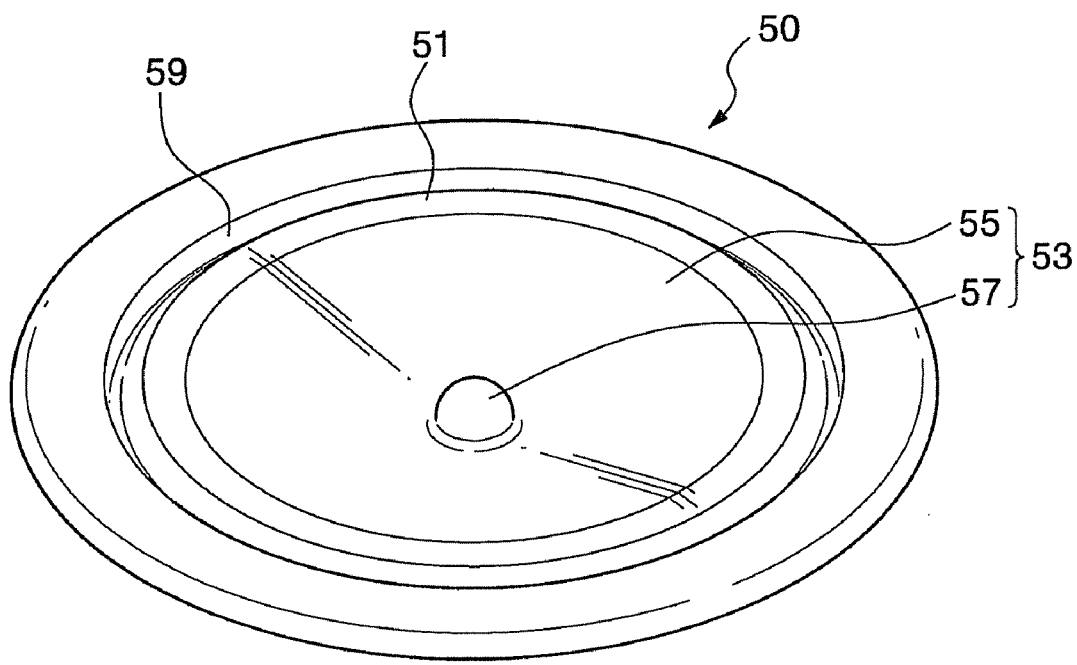
FIG. 3A is a perspective view of a vent in a cap assembly, according to an exemplary embodiment of the present invention.
Figure 3B:
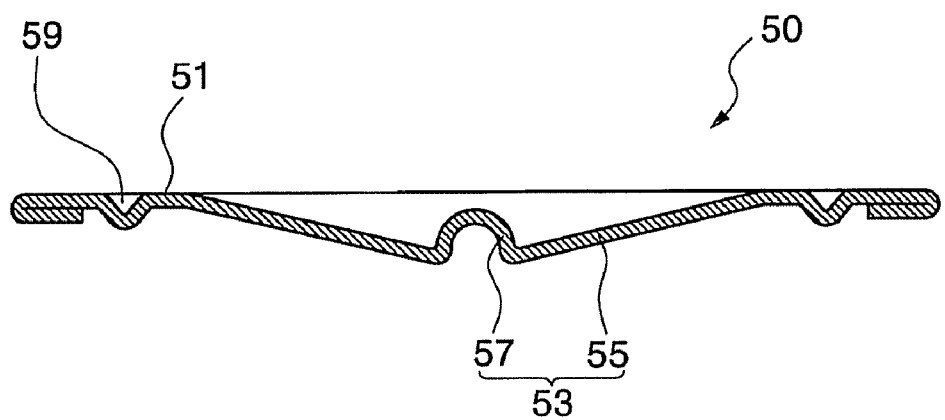
FIG. 3B is a cross-sectional view of the vent of FIG. 3A.

FIG. 3A is a perspective view of the vent 50, and FIG. 3B is a cross-sectional view of the vent 50. Referring to FIGS. 3A and 3B, the vent 50 is formed as a disk-shaped plate 51 (vent plate) and includes an electric connection portion 53. The electric connection portion 53 may be formed at any position in the plate 51. In some embodiments, the electric connection portion 53 is formed at a central portion of the plate 51, such that the CID 60 is easily activated when the electric connection portion 53 is deformed.

The vent 50 further includes a notch 59 to facilitate deformation of the vent 50. The notch portion 59 may extend toward the electrode assembly 20. Since the vent 50 may malfunction if the depth of the notch portion 59 is too deep, or too shallow, an appropriate depth may be selected by those skilled in the art.

The electric connection portion 53 is electrically connected to the electrode tab 27, and includes a deforming portion 55 and a protrusion 57. When the pressure is below a predetermined level, the deforming portion 55 extends toward the electrode assembly 20. When the internal pressure of the battery is above the predetermined level, the deforming portion 55 is gradually pressed against the CID 60, such that the deforming portion 55 is deformed toward the CID 60 and the protrusion 57 breaks the CID 60.

The protrusion 57 may be formed at any position in the deforming portion 55. For example, the protrusion 57 can be formed at the center of the deforming portion 55, such that the internal pressure is uniformly applied to the deforming portion 55. The protrusion 57 has a structure that facilitates the activation of the CID 60. Thus, when the deforming portion 55 extends toward the CID 60, the protrusion 57 is pressed against the CID 60, thereby causing the CID 60 to interrupt current flow in the battery. The protrusion 57 can be hemispherical, or conical, in shape.

The deforming portion 55 has a larger area and a smaller curvature than a conventional deforming portion, such that pressure is more uniformly applied to the entire area of the deforming portion 55. Therefore, the deforming portion 55 is uniformly deformed, thereby improving distribution of activation pressures.

The following Table 1 shows data indicating activation pressures of a conventional vent, according to a Comparative Example, and a vent according to an Exemplary Embodiment of the present invention.

TABLE 1

| Number | Comparative Example | Exemplary Embodiment |
| --- | --- | --- |
| 1 | 7.7 | 8.3 |
| 2 | 8.1 | 8.3 |
| 3 | 7.2 | 7.8 |
| 4 | 6.9 | 7.3 |
| 5 | 8.4 | 8.3 |
| 6 | 7.2 | 8.1 |
| 7 | 7.4 | 7.8 |
| 8 | 9 | 7.4 |
| 9 | 7.6 | 8.2 |
| 10 | 7.6 | 8.1 |
| 11 | 8.2 | 8.5 |
| 12 | 6.8 | 7.9 |
| 13 | 7.1 | 8.4 |
| 14 | 10.4 | 7.3 |
| MAX | 10.4 | 8.5 |
| MIN | 6.8 | 7.3 |

Table 1 shows data indicating pressures measured when a CID is activated by the vent, under a pressure of 7 kgf/cm². A total of 14 experiments are performed. As can be seen in Table 1, the Comparative Example had values ranging from a minimum of 6.8 kgf/cm², to a maximum of 10.4 kgf/cm². The Exemplary Embodiment had values ranging from a minimum of 6.8 kgf/cm², to a maximum of 10.4 kgf/cm². Thus, it can be seen that the vent of the Exemplary Embodiment, deformed at pressures closer to 7 kgf/cm² than the conventional vent of the Comparative Example.

The following Table 2 shows Cp (short-term process capability) values and Cpk (long-term process capability) values, calculated using MINI-TAP, which is a statistic program, based on the data in Table 1.

TABLE 2

|  | Comparative Example | Embodiment |
| --- | --- | --- |
| Cp | 1.12 | 2.29 |
| Cpk | 1.06 | 2.27 |

The Cp and Cpk are indices indicating whether a process has a capability of producing products that are suitable for particular specification, such as a ratio of the process capability to the specification. The Cp and Cpk respectively depend on a relationship between a specification and a bias. The Cp denotes a quantitative expression of an allowable process spread (part tolerance), with respect to an actual process spread (natural tolerance). The Cp is used when allowable specifications are provided for both values. Data was calculated by setting an upper specification limit (USL) and a lower specification limit (LSL) to be 11 kgf/cm² and 5 kgf/cm², respectively.

The Cpk is an index indicating a degree at which a process capability deviated from the center of distribution. A high Cpk means that it is less likely that deviations from the USL and the LSL will occur. The relation between the Cp and the Cpk is as follows:

$$Cpk=(k-1)Cp \quad (1)$$

In the above equation, k is a coefficient indicating a degree of bias, and is calculated as follows:

$$k = [\mu - M]\left(\frac{2}{T}\right) \quad (2)$$

In the above equation, μ denotes an average, M denotes a central value of a specification, and T denotes USL-LSL.

As can be seen in Table 2, the Cpk value of the Comparative Example is 1.06, and the Cpk value of the Exemplary Embodiment is 2.27, which is higher than 1.06. This indicates that it is less likely that the Exemplary Embodiment will deviate from the USL and the LSL, in a process. Thus, it can be seen that the distribution of activation pressures in the vent of the Exemplary Embodiment is improved, as compared with the distribution of the activation pressures in the conventional vent of the Comparative Example.

Although an exemplary embodiment of the present invention have been shown and described, it would be appreciated by those skilled in the art that changes may be made in this exemplary embodiment, without departing from the principles and spirit of the invention, the scope of which is defined in the claims and their equivalents.

What is claimed is:

1. A secondary battery comprising: an electrode assembly comprising a positive electrode plate, a negative electrode plate, and a separator interposed between the positive and negative electrode plates; a can to house the electrode assembly; and a cap assembly comprising a vent plate, to seal an opening of the can, wherein the vent plate comprises a concave deforming portion and a protrusion formed in the center of the deforming portion, wherein the protrusion has first and second surfaces opposing each other, wherein the first surface extends away from the electrode assembly, and wherein the second surface is concave along an axis defined by a ray originating at the electrode assembly; wherein the cap assembly further comprises a current interrupt device disposed on the vent plate; a positive temperature coefficient thermistor disposed on the current interrupt device; and a cap-up disposed on the positive temperature coefficient thermistor; wherein the current interrupt device is activated by the operation of the vent plate.

2. The secondary battery according to claim 1, wherein the vent plate is disk-shaped.

3. The secondary battery according to claim 1, further comprising an insulating gasket interposed between the cap assembly and the can.

4. The secondary battery according to claim 1, wherein the deforming portion is formed at the center of the vent plate.

5. The secondary battery according to claim 1, wherein the deforming portion is electrically connected to an electrode tab that is connected to the electrode assembly.

6. The secondary battery according to claim 1, wherein the protrusion is formed at the center of the deforming portion.

7. The secondary battery according to claim 1, wherein the protrusion and the deforming portion extend from the vent plate in opposing directions.

8. The secondary battery according to claim 7, wherein the deforming portion extends toward the electrode assembly.

9. The secondary battery according to claim 7, wherein the protrusion extends toward the opening of the can.

10. The secondary battery according to claim 1, wherein the vent plate comprises a notch that surrounds the deforming portion.

11. The secondary battery according to claim 10, wherein the notch extends toward the electrode assembly.

12. The secondary battery according to claim 1, wherein the cap assembly further comprises a cap-up formed on the top of the electrode assembly, and wherein the protrusion extends toward the cap-up.

13. The secondary battery according to claim 1, wherein the cap assembly further comprises a current interrupt device (CID) disposed on the vent plate, wherein the vent plate comprises a peripheral portion contacting the CID and an intermediate portion interposed between the peripheral portion and the protrusion, and wherein the distance between the CID and the intermediate portion substantially gradually increases from the peripheral portion to the protrusion.

14. The secondary battery according to claim 13, wherein the protrusion does not contact the CID.

* * * * *